United States Patent

[11] 3,618,038

[72] Inventor Edward S. Stein
5717 Nevada Ave. N.W., Washington, D.C. 20015

[21] Appl. No. 887,915
[22] Filed Dec. 24, 1969
[45] Patented Nov. 2, 1971

[54] TELEPHONIC DATA TRANSMITTING SYSTEM
6 Claims, 4 Drawing Figs.

[52] U.S. Cl. .......... 340/172.5, 179/2, 179/84
[51] Int. Cl. .......... H04m 11/06
[50] Field of Search .......... 340/172.5, 365; 179/2 DP, 84 VF

[56] References Cited

UNITED STATES PATENTS

| | | | |
|---|---|---|---|
| 3,270,144 | 8/1966 | Vogel et al. | 179/84 VF |
| 3,381,276 | 4/1968 | James | 340/172.5 |
| 3,403,225 | 9/1968 | Mislan et al. | 340/172.5 |
| 3,515,814 | 6/1970 | Morgan | 179/84 VF |
| 3,526,892 | 9/1970 | Bartlett et al. | 340/365 |

*Primary Examiner*—Gareth D. Shaw
*Assistant Examiner*—Paul R. Woods
*Attorney*—Walter S. Pawl

ABSTRACT: A data processing system comprising a telephone touch tone signaling set having a plurality of buttons thereon, an apparatus connected to the telephone system at the receiving end capable of being controlled by said touch tone signaling set according to the length of time that the buttons are pressed, to transmit alphanumeric data and programming data and a data processing mechanism for receiving said programming data and other data for processing the same. The apparatus is arranged to differentiate between short and long duration tones whereby a long duration tone is effective to select a group of alphanumeric data symbols, and a short duration tone is effective to cause the transmission of a particular one of the alphanumeric symbols to the data processing mechanism.

INVENTOR

Edward S. Stein

BY Walter S. Paul

ATTORNEY

INVENTOR
Edward S. Stein
BY Walter S. Paul
ATTORNEY

TELEPHONIC DATA TRANSMITTING SYSTEM

The present invention comprises apparatus for converting the switching in a telephone data set to alphanumeric code in a form suitable for entry into a data processing mechanism.

Prior art translators have been designed to interface between a telephone data set and a digital device such that the device may be controlled form a remote transmitting device. Heretofore, most translators have not been able generate more than ten numeric symbols when a ten button touch tone telephone handset is used at the transmitting end. One exception to this is the arrangement disclosed in the patent to James Ser. No. 3,381,276 issued Apr. 30, 1968, wherein a simultaneous depression of two buttons on the touch tone keyboard produces unique codes in the translator. These codes are then used to set special latches such that subsequent depressions of single buttons will produce not the numeric codes associated with the buttons but the alphabetic or other special codes associated with the buttons. By the James system one is able to generate more than 10 unique codes from a ten button telephone touch tone signaling means.

The invention disclosed in this application also has the feature of being able to generate more than 10 numeric code symbols on a ten button telephone. However, it has the advantage that it does not require a double depression of the telephone touch tone buttons and thus avoids error which can be generated by accidentally touching more than one button at a time. Furthermore, the present system has the advantage that it is not limited to six latches or special symbols that may be generated by the twin depression of buttons on the ten button touch tone telephone handset. In the present system as may special symbols or latches are possible as there are buttons on the touch tone signaling means of the telephone handset. It is thus possible to transmit symbols equal in number to the square of the number of buttons on the touch tone signaling means.

My invention also contemplates the insertion of apparatus between a telephone line and a data processing mechanism to which data is to be transmitted for programming the data processing mechanism and for data processing. However, such apparatus, instead of being exclusively responsive tone generated at a telephone handset, is responsive to the separate tones generated by the single buttons on the handset and also to the duration of the tones so generated.

This apparatus includes the necessary logic to differentiate between long and short time depressions of the buttons on the touch tone keyboard, which controls the duration of the tons. The short time depressions of the buttons would be instrumental in the transmission of one of a group of symbols which the buttons represent. The long time depression of a button would be instrumental in the selection of the group of symbols which would contain the symbol sought to be transmitted. The latter operation would be carried out by depressing the appropriate button for the long time period to set the appropriate latch for the transmission of the appropriate code symbol to the input of the data processing mechanism. When the latches are in their inactive state, the short time duration depressions of the buttons on the touch tone keyboard will transmit only the numerical symbols to the data processing mechanism.

The apparatus incorporates means for discriminating between short period depressions of the buttons on the keyboard as for example, a half second, and long time depressions as for example, one second or longer. Until there has been a long time depression of the buttons on the touch tone keyboard of the telephone handset, all the flip-flops or latches are in their inactive state. While they are all in their inactive state a short time depression results in one of the numeric symbols being transmitted from the apparatus to the data processing mechanism. As the buttons also represent other symbols as well as numeric symbols, symbols cause the apparatus to cause these other symbols to be transmitted to the data processing mechanism requires that a separate signal be transmitted from the telephone handset to the apparatus, which shall be termed a translator, to condition it for the selection of the group of symbols having the symbol that it is desired to transmit from the translator. Thus, generally speaking, the separate signal for controlling the translator to condition it for alphabetic or other symbol than numeric the transmission to the data processing mechanism is a long time depression of one of the buttons of the touch tone keyboard. Usually, all keyboard buttons except one will have a latch to be controlled thereby. For disengaging the latches, the button which has no latch assigned to it would be given a long time depression which will operate to deactivate all the latches and return them to their inactive state.

The invention thus comprises the combination of this apparatus or translator of the character to be described with a telephone system and data processing mechanism that permits this mode of operation of the signaling means on the telephone handset to cause the transmission of alphanumeric symbols to a data processing mechanism.

It is an object of the invention to provide an apparatus and mode of operation, that will greatly expand the range of signals that can be transmitted from a touch tone keyboard of a telephone handset to a data processing mechanism.

It is another object of the invention to provide an apparatus adapted to a particular mode of operation of a touch tone signaling means of a telephone handset which will provide for the transmission of a multiplicity of input signals for such button on the touch tone keyboard.

Still another object of the invention is to provide means and mechanism to enable widely scattered customers to have greater access to a centralized data processing mechanism than is provided by the prior art, without the need for special equipment at the customer's establishment and without modification of the telephone system.

Still, another object of the invention is to expand the number of symbols that may be transmitted to a data processing mechanism from a touch tone keyboard to a number equal to the square of the number of buttons on the touch tone keyboard.

Other objects of the invention will be obvious from consideration of the specification and the accompanying drawings, in which.

Figure 1:
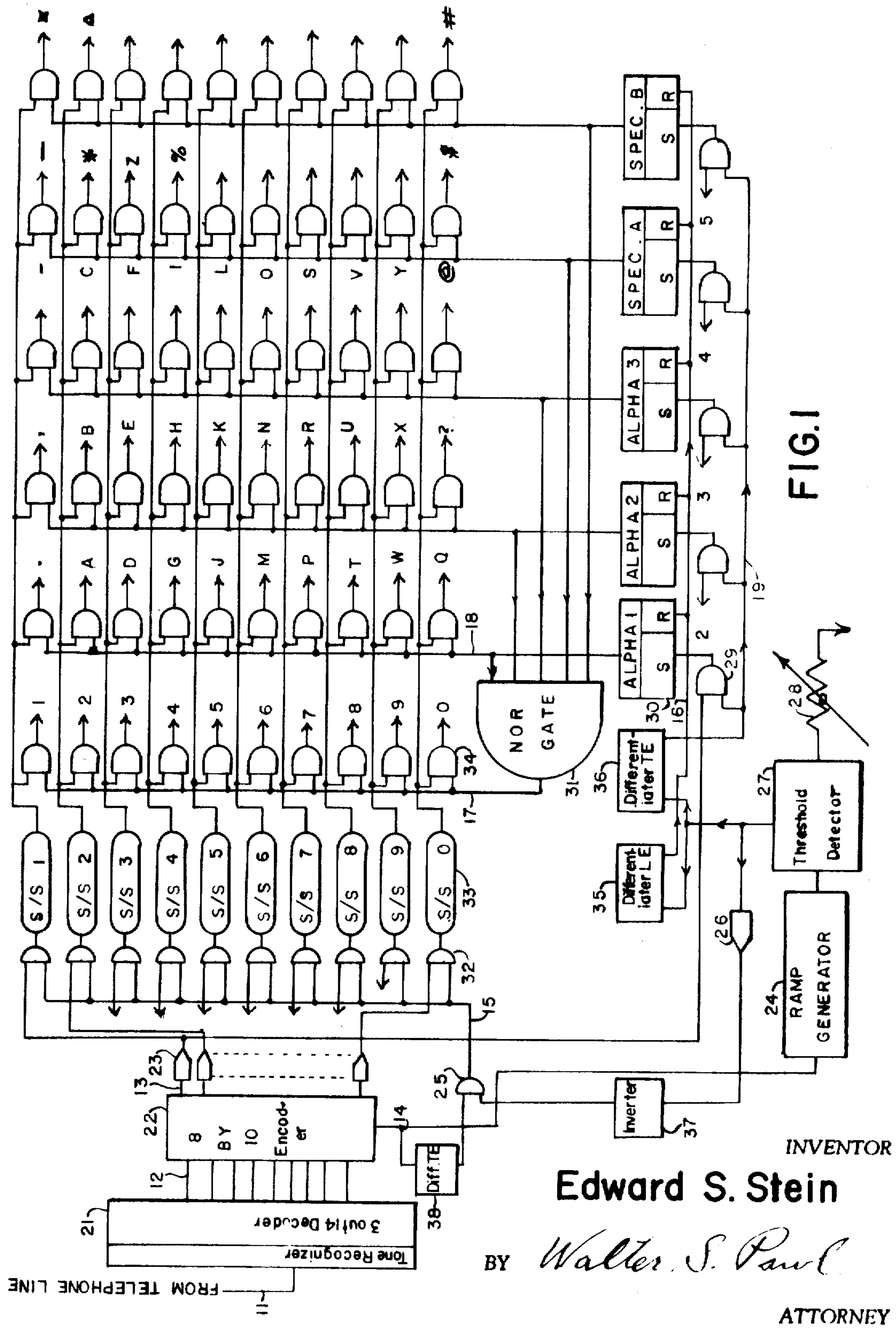
FIG. 1 is a schematic drawing of the mechanism or apparatus to be located at the site of the computer, or data processing mechanism, and connected to a telephone system and for producing alphanumeric code output compatible with the requirements of the input of the data processing mechanism to which the data is to be fed.
Figure 3:
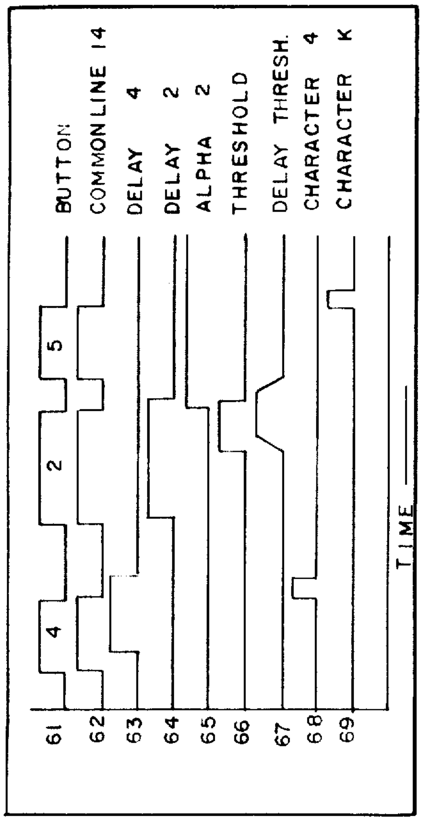

FIG. 3 id a diagram showing the time relation of the voltage variations in the various parts of the apparatus, to assist in the understanding of the mode of operation of the apparatus of FIG. 1.

Figure 4:
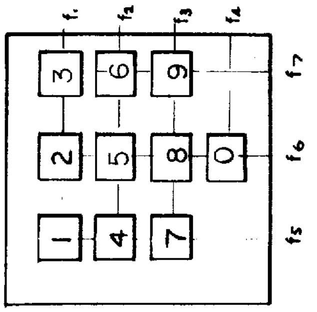

FIG. 4 is a schematic of a 10-button touch tone keyboard signaling means of a telephone handset.

Referring now to FIG. 4 of the drawings, there is disclosed by way of example a 10-button touch tone signaling keyboard that is now in common use. The buttons are numbered from 1 to 0 inclusively, and they usually include three alphabet letters in addition to the numbers. The letters are on the buttons number 1 to 9 and the letters Q and Z are omitted. Q button 0 has no other symbol thereon. While the buttons are so enscribed presently with characters it is possible with this invention to include and utilize many more symbols and characters on each button. In the telephone handset to be used with the apparatus it is contemplated that the buttons will be enscribed with all the characters necessary to utilize the full capabilities of the invention. While 100 different characters are possible of transmission to the input of a data processing mechanism, in the present disclosure, for the purpose of simplicity of disclosure, only 60 characters are provided for. Thus each button could have six or more characters enscribed thereon.

The buttons are arranged in four horizontal rows and three vertical rows. The conventional handset provides for the transmission of a pair of frequencies for each button, which two frequencies make up a given tone. The first row of buttons are assigned a frequency $f_1$, the second row a frequency $f_2$, the third row a frequency $f_3$ and the fourth frequency $f_4$. The vertical rows in the left to right direction are assigned the frequencies $f_5$, $f_6$ and $f_7$.

In this arrangement each button is instrumental in the transmission of two frequencies, one by reason of its vertical position and one by reason of its horizontal position. As a consequence, each button is instrumental in the transmission of a different combination of frequencies totaling 10 tones. Normally the keyboard can produce only ten tone signals. except, when operated as disclosed in the James patent wherein six additional tone signals may be transmitted. By my mode of operation of the buttons on this keyboard 10 additional signals can be transmitted using the same ten buttons. These additional signals are utilized for controlling a selecting mechanism in the translating apparatus.

For transmitting 10 additional signals to control this translating apparatus, the buttons are depressed for a longer than normal time period. The normal signals would be transmitted by a short-duration depression of the buttons and the 10 additional signals would be transmitted by a long duration depression of the buttons.

The apparatus receiving the signals from the handsets is provided with means for detecting signals of different duration and for causing certain switching depending on which particular button that is depressed for the long period. The telephone handset which is partially disclosed in FIG. 4 represents only an example of a signalling means for the introduction of data into a data processing mechanism and it is connected by the conventional circuits to the station wherein the computer or data processing mechanism is located.

Referring now to FIG. 1 of the drawings, there is schematically illustrated, the apparatus turned translator for converting the 10 symbol numeric code into an alphanumeric code capable of containing 100 code symbols.

The input 11 is connected to the telephone system through the standard telephone data set 21 including a tone recognizer. This is only one of several interface connectors that may be used, although there are other suitable means for coupling to the telephone system and recognizing the tones. In the data set shown here there are means which recognize the tones of the signals transmitted from the handset and which operate relays causing their closure in a three out of 14 code. The particular code used is of no import to the present invention. It is sufficient to state that the data set responds to audio tones on the telephone line and produces switch closures corresponding to each particular code of tones received. For the purpose of this disclosure the contacts are divided into three groups, as group A, group B and group C respectively. To decode those tons associated with a 10 -button telephone touch tone keyboard, it is necessary only to utilize the A and B groups. Each of these groups contains four contacts corresponding to the row and column audio tones associated with the 10-button keyboard. The output from the data set consists of eight lines 12, which connect the data set to the encoder 22. The encoder 22 converts the eight lines output as represented by the lines 13. In addition there is a common line 14 which responds to each and every signal input to the encoder 22.

In this arrangement there will be an output pulse on one of the lines 13 for each button depressed at the handset, there being one line for each of the buttons on the handset signaling means.

Each of the lines 13 contains a delay device 23 and is connected respectively to one input terminal of each of two AND-gates 32 and 29. In other words each line 13 is connected through a delay device 23 to one input terminal of one of the gates 32 and to one input terminals of the gates 29. The other input terminals of the gates 32 are connected to a common line 15, and this line is connected through an AND-gate 25 and differentiator 38 to the common line 14.

The output terminals of each of the AND-gates 32 are connected to a single-shot multivibrator 33 and the output from the single-shot multivibrators 33 are each connected to a separate line that is in turn connected to one terminal of a horizontal row of AND-gates 34 in a matrix arrangement. The present matrix is illustrated as containing ten horizontal rows of AND-gates 34, the AND-gates 34 also forming six vertical rows of gates. It is contemplated that with a 10-button telephone that 10 vertical rows or columns could be used instead of six vertical rows.

Ten vertical and ten horizontal rows of "and" gates 34 will provide for one hundred different outputs or symbols. Each horizontal row of "and" gates 34 is connected to a separate single shot multivibrator 33. Thus when any single shot multivibrator 33 is energized, one terminal of each of the "and" gates 34 connected to the energized single shot multivibrator will be energized for the same period. The first vertical row or column of "and" gates 34 represents the numerals 1 through 0 inclusive, the second vertical row or column of "and" gates 34 represent (.) and the letters A, D, G, J, M, P, T, W, and Q, the third vertical row or column of "and" gates the (,) letters B, E, H, K, N, R, U, X and ?, the fourth vertical row or column of "and" gates the (-) and letters C, F, I, L, O, S, V, Y and (@). The other vertical rows or columns of the "and" gates 34 may represent any other symbols which the user may desire merely by assigning such symbols thereto as may be required for the transmission of data and for the control of programming of the data processing mechanism. The particular code in use will be the same as that displayed on the buttons of the touch tone keyboard. It is obvious that the alphanumeric coding means of the present disclosure will provide an adequate number of symbols and outputs for just about every conceivable requirement. Should this not be the case, the requirements can be met by recourse to a twelve or sixteen button telephone handset and a matrix having the corresponding larger number of "and" gates therein.

Figure 2:
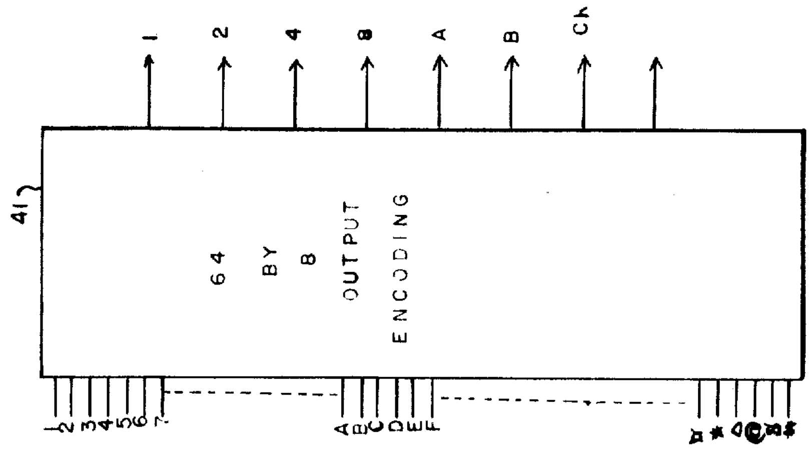
FIG. 2 is a schematic drawing of an alphanumeric to digital converting mechanism to be introduced between the alphanumeric apparatus of the present invention and the data processing mechanism such as a computer used as an example for the purposes of disclosure of the invention.

The outputs from the AND-gates 34 are connected to separate input terminal of the output encoding matrix 41, shown in FIG. 2 of the drawings. The encoding matrix 41 has eight output terminals which provide the requisite input lines for a digital computer, which is used herein as one example of a data processing mechanism. The matrix 41 will take the form necessary to convert the alphanumeric code data to the form and content necessary for the nature of the apparatus that is to receive the transmitted data. The matrix 41 itself is usually an integral part of the data processing mechanism and will be in a form to comply with the data processing mechanism with which it is associated.

When it is desired to transmit one of the alphabetic or special character symbols, which are also enscribed on the buttons of the touch tone keyboard, a particular button is depressed for a long time period. This operates to set latches or switching means such that the numeric symbols will not be transmitted and only one of the group of symbols under the control of the particular latch activated can be transmitted. There after, when a button on the keyboard is depressed for a short time duration one of the character symbols of the selected group will be transmitted. The symbol selected is of course the one that the button depressed represents.

For carrying out this operation the translator apparatus includes a means for differentiating between the long and short time duration of the signals sent out from the touch tone keyboard. For this purpose there is a ramp generator 24 connected to the line 14, which operates while the buttons are depressed. When any of the buttons on the touch tone keyboard are depressed, the ramp generator 24 generates a voltage output that increases at a uniform rate with time. The ramp generator 24 is connected to a threshold detector 27 having a means 28 for adjusting it to a threshold voltage. The threshold detector 27 will be adjusted to a threshold voltage that would prevail at the output of the ramp generator 24 at the end of one second. When the buttons on the touch tone keyboard are depressed for a short time duration, as for example one-half second or less than one second, the voltage output from the ramp generator 24 will not rise in that short time period to a level at which the threshold detector is set and no output will be produced from the threshold detector. However, should one of the buttons be depressed for a long time period, as for example for a period equal to or in excess of one second, the output voltage of the ramp generator 24 will rise above the threshold setting of the threshold detector 27, and it will produce an output voltage that prevails so long as the voltage remains above the threshold setting of the threshold detector 27. When the button is released the output voltage of the ramp generator 24 returns immediately to its zero or minimum value.

The threshold detector 27 has its output connected through a delay device 26 and an inverter device 37 to the remaining terminal of the "and" gate 25. The inverter device 37 operates to produce an opposite energy state from that which prevails at its input terminal. Thus while the output from the threshold detector 27 is zero, the input through the inverter 37 to the gate 25 will be at its maximum value. The combination of the inverter with the gate conditions it for the passage of a pulse therethrough from the line 14 to the gates 32 when the trailing edge of the pulse on the line 14 is present. To assure that the pulse through the gate 25 will only occur when the trailing edge of the pulse on the line 14 passes, the differentiator 38 responds to the trailing edge of the pulse in line 14 and produces the pulse that energizes the line 15 to a ready state and energizes one input terminal of the gates 32. The pulse to the other input terminal of the gate 32 from the delay device 23 selects which one of the gates 32 in the vertical row or column will transmit. It will be seen that while all the gates 32 are energized by line 15 for the duration of the pulse thereon, only one gate 32 will be simultaneously energized through the delay device 23 and only one gate 32 will energize the corresponding single-shot multivibrator 33.

The above arrangement responding to a short duration pulse on the line 14 caused by a short time depression of a button on the touch tone keyboard energizes the ramp generator. But, since the output voltage from the ramp generator does not rise in the time alloted by the short time depression of the button to a value adequate to activate the threshold detector 27, there will be no voltage on the line through the delay device 26 to the inverter 37. As a consequence, the output of the inverter 37, being the opposite of its input, will energize the input terminal of the gate 25 connected thereto and thus conditions the gate for the passage of the voltage pulse generated in the differentiator 38 by the trailing edge of the voltage on the line 14. When the button on the keyboard is released the voltage on the line 14 terminates and the differentiator 38 responds to produce the voltage pulse through the gate 25 which alerts all the gates 32. At the moment of this pulse, there will also be a voltage pulse on one of the lines 13 and this voltage pulse will pass through one of the gates 32 to activate one of the single shot multivibrators 33, connected to the gate 32. As will later disclosed, under this condition, only the line 17 of the matrix of AND-gates 34 will be energized and thus the output from the single-shot multivibrator 33 thus fired will activate only one of the gates 34 to transmit to the computer or data processing mechanism a numerical symbol.

As stated heretofore, only the line 17 is energized to alert the gate in the vertical column connected to line 17 and the other gates 34 in the vertical columns connected to the line 18 are not energized and are not alerted. The threshold detector 27 does not produce a voltage pulse until the ramp voltage reaches and exceeds the threshold voltage and only during the period while that voltage exceeds the threshold voltage.

The threshold detector 27 is also connected to a pair of differentiating devices 35 and 36 which respectively respond to the leading and trailing edges of the voltage pulse produced by the threshold detector 27. The output from the differentiating device 35 is connected to the "reset" input of the flip-flops or latches 30. As a consequence of a pulse issuing from the differentiating device 35, each of the flip-flops will be activated to their "reset" state, in which while in this state there will be no voltage output therefrom. The flip-flops or latches 30 have their outputs connected to the vertical lines 18 and they control the energization of lines 18 and the alerting of the gates 34 that are connected to these lines. Also, all the flip-flops 30 are connected to the input of the NOR-gate 31. and the NOR-gate will energize the line 17 to alert the first vertical column of gates 34 thus limiting the activation of gates 34 to those in the first vertical column. While there is no voltage output from the flip-flops 30, there will be no voltage on the input terminals of the NOR-gate 31.

The differentiating device 36 has its output connected to line 19 which is connected to one output terminal of each of the AND-gates 29. The output terminals of each of the AND-gates 29 are connected to the "set" input of the flip-flops 30, there being one AND-gate 29 for each flip-flop 30. The AND-gates 29 when activated cause the flip-flops 30 to shift to their "set" state, and while in this state, they produce an output voltage on the lines 18. The other input terminals of the AND-gates 29 are each respectively connected to one of the lines 13 at a point just beyond the delay device 23.

As will be seen in the drawings the AND-gate 29 associated with the flip-flop termed "Alpha 1" is connected to the line 13 associated with the single-shot multivibrator S/S 1. The other AND-gates 29 are respectively connected to the line associated with the single shot multivibrators S/S 2, S/S 3, S/S 4 and S/S 5. While as disclosed there are only five AND-gates 29 illustrated, it is to be understood that the maximum number will be one less than the number of buttons on the touch tone keyboard and the number of vertical columns in the matrix of AND-gates 34.

The AND-gates 29 are only alerted upon the occurrence of the trailing edge of the output of the threshold detector which happens when there is a long time depression of the buttons on the touch tone keyboard of the telephone handset. As previously set forth, during the leading edge of the voltage pulse of the threshold detector, the flip-flops 30 are each activated to be placed in their reset state. The AND-gate 39 activated, will be controlled by the particular touch tone button on the keyboard that is depressed. Thus, it will be seen that by depressing the appropriate button for a long time period, the proper vertical column of AND-gates 34 will be alerted by the flip-flops 30. When a subsequent short time duration depression of the button is made, the button depressed will select the alphabetic or special character symbol in the alerted vertical column in the matrix and cause it to be activated or to be transmitted as by sending a pulse to the terminal of the digital computer or data processing mechanism connected therewith. The vertical column remains alerted until a subsequent long time depression of the buttons, when the differentiating device 35 responding to the leading edge of the pulse from the threshold detector 27 resets the flip-flops to their "reset" state. When any one of the flip-flops 30 energizes any one of the lines 18 there will also be a voltage on one of the input terminals of the NOR-gate 31. As previously stated, this voltage on the input to the NOR-gate 31 causes the deenergization of the line 17 so that during the alerting of the alphabetic or special symbol columns in the matrix the column representing the numerical symbols will be nonalerted.

To return to the numerical symbols and to deactivate all the flip-flops 30 all that is needed is that the (0) button on the touch tone keyboard be depressed for a long time period. The button has no gate 29 associated therewith so that the leading edge of the output of the threshold detector is effective to return all the flip-flops to their "reset" state. Since there is no flip-flop and gate for the (0) button of the touch tone keyboard the trailing edge of the output of the threshold detector 27 will be ineffective. With all the lines 18 deenergized there will be no input on the NOR-gate 31 and the NOR-gate will provide the voltage to energize the line 17 to alert the gates 34 in the numerical column.

Referring to FIG. 3 of the drawings, there is disclosed a chart of the voltage pulses and their time relation which will help in disclosing the mode of operation of the translator of FIG. 1. The trace 61 represents the audio frequency pulses transmitted form the telephone handset when the buttons 4, 2 and 5 are respectively depressed for a short long and short time duration in that sequence. The first pulse represents the output from the button 4 and is intended to represent a short tine depression of the button 4. The trace 62 discloses the voltage variations in the common line 14 leading from the encoder 22. As will be seen in the comparison of the two traces, they are substantially in synchronism. The trace 63 discloses a voltage variation that lags slightly behind the voltage pulses in the traces 61 and 62. This represents the time variation relation of the voltage pulses emanating from the delay device 23 in relation to the voltage pulses in the common line 14. Since there is an overlapping in time of the voltage pulses of traces 62 and 63, trace 68 discloses a voltage pulse output from the gate 34 representing the numerical symbol 4. As previously stated, this is brought about because the gate 25 is alerted to voltage pulses from line 14 through the differentiating device 38 and by reason of the inverter 37 producing an energizing voltage on the gate 25 when there is no output from the threshold detector 27. Traces 65, 66 and 67 show that there is no response in the flip-flops 30, threshold detector 27 and delay device 26 to the depression of the button representing the numerical symbol 4.

On the other hand, as shown in trace 61, the second voltage pulse occuring by reason of the long time depression of the button 2, produces a longer duration voltage pulse in the common line 14 shown in trace 62. Trace 64 shows the delayed pulse overlapping the trailing edge of the voltage pulse in the line 14 shown in trace 62. The ramp generator 24 operates with the initiation of the pulse on line 14 to produce a voltage uniformly increasing with time. Not until the latter part of the long time pulse will the threshold detector respond to the output of the ramp generator 24 to produce a pulse shown in trace 66. The output pulse from the threshold generator 27 is shown in trace 67 having a leading and trailing edge. The output from the threshold detector 27 operates with little or no delay on the differentiating devices 35 and 36 and with a slightly greater delay on the inverter 37 by the delay means 26 to close the gate 25, so that gates 32 will not be alerted and will be closed to the passage of the voltage pulses therethrough. As a consequence, traces 68 and 69 show no voltage pulse to represent the activation of any of the gates 34.

On the other hand, when the button 2 is depressed for the long time duration the leading edge of the output of the threshold detector operates in the leading edge differentiating means 35 to produce a voltage pulse which is transmitted through line 16 to the "reset" input terminals of the flip-flops 30. The voltage pulse assures that all the flip-flops 30 will be in their "reset" state, during which, none of the vertical lines 18 are energized. The trailing edge of the output pulse of the threshold detector 27 operates in the trailing edge differentiating device 36, to produce a pulse in the line 19 that alerts the gates 29, and the gate 29 that is connected to the line 13, representing the button (2) will be activated, causing the flip-flop "alpha 2 " to energize the vertical line 18 connected therewith and also energize one input terminal of the NOR-gate 31 to cause the deenergization of the line 17. Thus the matrix of gates 34 is conditioned for the selection of one of the gates 34 in the vertical column controlled by the flip-flop "alpha 2. " A subsequent depression of any one of the buttons for the short time duration will thus select the appropriate AND-gate 34 in the vertical column controlled by the flip-flop "alpha 2" and cause it to be activated, to transmit an input voltage pulse to the output encoding matrix 41, which in turn is fed to the data processing mechanism in a form compatible with the requirements. Trace 69 illustrates that the subsequent button depressed was the button 5, and that the character resulting was the character "*k*."

The matrix of gates 34 remains set to the selection of one of the gates controlled by the flip-flop 30 "alpha 2" until there is another long time depression of one of the buttons on the touch tone keyboard. When this occurs the flip-flops 30 are cleared by the pulse from the leading edge differentiating means 35 and a different flip-flop is activated to select a different column or group of gates for control by the subsequent short time depression of the keys or buttons on the touch tone keyboard.

What is claimed is:

1. A data processing system comprising
   a data processing mechanism disposed at a first location,
   at least one telephone handset disposed at a second location and connected in a telephone system, said telephone handset having a touch tone dialing means with buttons thereon capable of producing as many signals as there are buttons and capable of being depressed for at least two distinct time periods,
   a translator apparatus at said first location interposed between said telephone system and said data processing mechanism, having means for producing as many outputs as the square of the number of buttons on said handset, each output representing a separate data symbol,
   means responsive to the depression of said buttons for one time period for the selection of said outputs by groups equal in number to the number of buttons on said handset,
   means responsive to the depression of said buttons for the other time period for selecting one of the outputs from the selected groups of outputs for transmission of a signal to said data processing mechanism, and
   means for connecting said outputs to said data processing mechanism, whereby said data processing mechanism may be programmed and be fed data thereto for processing from said second location.
2. A data processing system comprising
   a data processing mechanism disposed at a first location,
   at least one telephone handset disposed at a second location and connected in a telephone system, said handset having a touch tone dialing means with buttons thereon, each button capable of producing a distinctive and separate signal when depressed and capable of being depressed for a long and short time period during the production of said signals,
   a translating apparatus at said first location interposed between said telephone system and said data processing mechanism, said translator apparatus including
   a matrix of output devices arranged in rows and columns, each output device representing a particular alphanumeric or special data symbol,
   means responsive to a long time depression of the buttons on said handset, operable for alerting a column of said output devices corresponding to the particular button depressed, and
   means responsive to a short time depression of the buttons on said handset operable for energizing an output device in the alerted column, and
   means for connecting said output devices to said data processing mechanism, whereby said data processing mechanism may be programmed and have data fed thereto for processing from said second location.
3. A data processing system according to claim 2, wherein said means responsive to a long and short time depression of the buttons on said handset includes
   a generator for producing a ramp voltage that increases in value during the depression of said buttons,
   a threshold detector operable when said ramp voltage reaches a predetermined value for producing a voltage pulse having a duration equal to the time interval that the voltage exceeds the predetermined value,
   a differentiating device responsive to the leading edge of said voltage pulse for nonalerting the columns of output devices,
   a differentiating device responsive to the trailing edge of said voltage pulse for alerting a column of output devices corresponding to the button depressed, and means responsive to ramp voltages below the predetermined value, operable for energizing an output device in said alerted column corresponding to the button depressed for the short time period.

4. A data processing system according to claim 2, wherein said translator apparatus comprises a matrix of output devices arranged in rows and columns, each having a pair of inputs, one input connected to a horizontal feeder common to the row and one input connected to a vertical feeder common to the column, each output device representing a distinct data symbol, and when energized at both of its inputs operable to transmit a voltage output, a generator for producing a ramp voltage that increases in value during the depression of said buttons, a threshold detector operable during a long time depression of said buttons when said ramp voltage exceeds a predetermined value for producing a voltage pulse that persists while said ramp voltage exceeds the predetermined value, means responsive to the leading edge of said threshold voltage to deenergize all vertical feeders except one, means responsive to the trailing edge of said threshold voltage operable to energize one of said vertical feeders and to deenergize the excepted one of said vertical feeders, and means responsive to a subsequent depression of said buttons for a short time period operable to energize a horizontal feeder corresponding to the button depressed, for said short time period, whereby one of the output devices in the energized column will activated to produce a voltage output.

5. A data processing system in accordance with claim 4 wherein said means responsive to a short duration depression of said buttons includes means operable when said threshold detector produces a voltage output to prevent the simultaneous energization of said horizontal feeders and operable when said threshold detector produces no voltage to permit the selective energization of said horizontal feeders in correspondence with the button depressed.

6. A data processing system in accordance with claim 5, wherein said means comprises a plurality of AND gates for controlling the energization of said horizontal feeders, a means operable in response to the absence of a voltage from said threshold detector to energize one input of each of said AND gates when said buttons are depressed, and means operable in accordance with the particular button depressed to energize the other input terminal of said AND gate associated with said button to energize the horizontal feeder associated with said button.

* * * * *